United States Patent
Tsuboi (10) Patent No.: US 9,083,215 B2
(45) Date of Patent: Jul. 14, 2015

(54) POWER GENERATION APPARATUS

(71) Applicant: Kobe Steel, Ltd., Kobe-shi (JP)

(72) Inventor: Noboru Tsuboi, Kako-gun (JP)

(73) Assignee: Kobe Steel, Ltd., Kobe-shi (JP)

( * ) Notice: Subject to any disclaimer, the term of this patent is extended or adjusted under 35 U.S.C. 154(b) by 162 days.

(21) Appl. No.: 13/723,578

(22) Filed: Dec. 21, 2012

(65) Prior Publication Data

US 2013/0207396 A1 Aug. 15, 2013

(30) Foreign Application Priority Data

Feb. 14, 2012 (JP) ................................. 2012-029356

(51) Int. Cl.
| | |
|---|---|
| F01K 23/06 | (2006.01) |
| F01K 19/00 | (2006.01) |
| H02K 9/00 | (2006.01) |
| H02K 9/20 | (2006.01) |
| H02K 9/193 | (2006.01) |
| H02K 7/18 | (2006.01) |
| F01K 13/00 | (2006.01) |

(52) U.S. Cl.
CPC ................ *H02K 9/193* (2013.01); *F01K 13/00* (2013.01); *H02K 7/1823* (2013.01)

(58) Field of Classification Search
CPC ............................................... H02K 9/00–9/28
USPC ..................... 60/643–681; 310/52–54, 58–65
See application file for complete search history.

(56) References Cited

U.S. PATENT DOCUMENTS

| | | | | |
|---|---|---|---|---|
| 2,491,314 | A * | 12/1949 | Hopkirk | 290/2 |
| 2,781,640 | A * | 2/1957 | Riehl | 60/661 |
| 3,024,366 | A * | 3/1962 | Yanagimachi | 290/2 |
| 3,292,366 | A * | 12/1966 | Rice et al. | 60/651 |
| 4,262,485 | A * | 4/1981 | Kuroda et al. | 60/669 |
| 4,363,216 | A * | 12/1982 | Bronicki | 60/657 |
| 6,206,660 | B1 * | 3/2001 | Coney et al. | 417/438 |
| 6,304,011 | B1 * | 10/2001 | Pullen et al. | 310/52 |
| 7,797,938 | B2 * | 9/2010 | Ruiz | 60/614 |
| 8,839,622 | B2 * | 9/2014 | Myers et al. | 60/670 |

FOREIGN PATENT DOCUMENTS

| | | |
|---|---|---|
| JP | 11-351168 | 12/1999 |
| JP | 2004-353571 | 12/2004 |

* cited by examiner

*Primary Examiner* — Christopher Jetton
(74) *Attorney, Agent, or Firm* — Oblon, McClelland, Maier & Neustadt, L.L.P.

(57) ABSTRACT

A power generation apparatus according to the present invention includes: an inlet which is provided at a location on an opposite side of an expander rotor with respect to a power generator stator in a power generator housing and which is capable of leading a working medium into the power generator housing, a cooling flow passage which supplies the inlet from a circulation pump with the working medium without interposition of an evaporator, a communication opening which is capable of leading the working medium out of the power generator housing so as to lead the working medium to a condenser, and a throttle valve which depressurizes the working medium led via the cooling flow passage from the circulation pump into the power generator housing.

6 Claims, 7 Drawing Sheets

POWER GENERATION APPARATUS

BACKGROUND OF THE INVENTION

1. Field of the Invention

The present invention relates to a power generation apparatus using the Rankine cycle.

2. Description of the Related Art

A power generation apparatus such as one described in Japanese Patent Application Laid-Open 2004-353571 has been known.

The power generation apparatus described in the above-mentioned publication includes a steam generator which generates high pressure steam serving as a working medium, a turbine power generator which includes a turbine driven by the high pressure steam, a power generator which carries out power generation in accordance with the drive of the turbine, a condenser which cools and condenses low pressure steam after the drive of the turbine, and a liquid transfer pump which pressurizes and transfers the working medium after the condensation into the steam generator.

In the power generation apparatus, the working medium is used to cool a stator of the power generator. Specifically, a cooling jacket is provided on an outer peripheral portion of the stator (housing which stores the stator) of the power generator. Then, the stator is cooled by a part of the working medium (condensed liquid) pressurized by the liquid transfer pump, which is led to the cooling jacket of the generator. The working medium which has cooled the stator is returned from the cooling jacket to the condenser.

SUMMARY OF THE INVENTION

However, the power generation apparatus in the aforementioned related art cannot efficiently cool the power generator. Specifically, the working medium led into the cooling jacket is pressurized by the liquid transfer pump, and thus cannot efficiently take the heat from the power generator (the heat of the power generator is merely taken as sensible heat into the working medium). Moreover, the stator is indirectly cooled via the housing on which the cooling jacket is formed, and there is thus a limit to an increase in cooling efficiency. Further, the cooling jacket needs to be formed, and a manufacturing cost of the power generator increases.

According to an aspect of the present invention, provided is a power generation apparatus which can efficiently cool the power generator.

In order to solve the above-mentioned problem, the present invention provides a power generation apparatus including: an evaporator that evaporates a working medium; an expander that includes an expander rotor rotated by an expansion force of the working medium evaporated in the evaporator; a power generator that includes a power generator rotor connected to the expander rotor, a power generator stator arranged around the power generator rotor for generating electric power with the power generator rotor, and a power generator housing for storing the power generator rotor and the power generator stator; a condenser that condenses the working medium led out from the expander; a circulation pump that transfers the working medium from the condenser to the evaporator; and a cooling mechanism that cools the power generator, in which the cooling mechanism includes: an inlet which is provided at a location on an opposite side of the expander rotor with respect to the power generator stator in the power generator housing, and is capable of leading the working medium into the power generator housing; a cooling flow passage which supplies the inlet from the circulation pump with the working medium; an outlet capable of leading the working medium out of the power generator housing so as to lead the working medium to the condenser; and a depressurizing mechanism that depressurizes the working medium led via the cooling flow passage from the circulation pump into the power generator housing.

The present invention includes the inlet which can lead the working medium into the power generator housing, and the depressurizing mechanism which depressurizes the working medium led via the cooling flow passage from the circulation pump into the power generator housing. As a result, the depressurized working medium can be brought in direct contact with the power generator rotor and the power generator stator. The depressurized working medium becomes wet steam by a slight quantity of heat, and thus the heat from the power generator rotor and the power generator stator can be used as latent heat for the working medium. Thus, the depressurized working medium is brought in direct contact with the power generator rotor and the power generator stator, so that the power generator can be efficiently cooled by using a small quantity of the working medium compared to a power generation apparatus in the related art using the heat from the power generator as sensible heat, in which the working medium flows through the cooling jacket.

Particularly, according to the present invention, the inlet is provided at a location on an opposite side of the expander rotor with respect to the power generator stator. As a result, the power generator can be efficiently cooled compared to a case in which the working medium is led into the power generator housing from a location closer to an expander rotor or a lateral position of the power generator stator.

Specifically, if the working medium is led in from the location closer to the expander rotor, there are shafts connecting the power generator rotor and the expander rotor with each other between them and the shafts constitute an obstacle, so that the working medium cannot be efficiently brought in contact with the power generator rotor and the power generator stator. Moreover, if the working medium is led in from the lateral position of the power generator stator, the working medium can be brought in contact with only a part of the power generator stator, and the entire power generator cannot be efficiently cooled.

In contrast, according to the present invention, the working medium can be led in from a location on the opposite side of the shafts connecting the expander rotor and the power generator rotor with each other, which is deviated from the lateral surface of the power generator stator. Therefore, according to the present invention, the working medium can be evenly brought in contact with the power generator rotor and the power generator stator, and the power generator can be efficiently cooled.

Although a configuration in which the power generator housing and the expander housing are constructed as a single housing is not excluded, it is preferable, in the power generation apparatus, for the expander to include an expander housing which stores the expander rotor; and for the power generator housing and the expander housing to be detachable from each other.

In this aspect, the power generator housing and the expander housing are detachable from each other. As a result, maintenance, replacement of components, and the like can be carried out independently for the power generator and the expander.

It is preferable, in the power generator apparatus, for an exhaust opening which leads out the working medium used for rotation of the expander rotor from the expander housing to be provided on the expander housing; and for the outlet to communicate the power generator housing and the expander housing with each other so that the working medium in the power generator housing is led to the exhaust opening.

The power generator housing and the expander housing communicate with each other via the outlet so that the working medium in the power generator housing is led to the exhaust opening in this aspect. As a result, the working medium used to cool the power generator can be returned to the condenser by using the exhaust opening used to return the working medium used for the rotation of the expander rotor to the condenser. Thus, it is not necessary to newly provide a flow passage (a pipe) to return the working medium used to cool the power generator to the condenser, and a manufacturing cost of the power generation apparatus and the size of the power generation apparatus can be reduced. Moreover, a possibility of a leakage of the working medium and the like in the new flow passage can be eliminated, differently from the case of providing the new flow passage.

It is preferable, in the power generation apparatus, for the outlet to be provided at a location closer to an expander rotor with respect to the power generator stator.

In this aspect, the outlet is provided on the opposite side of the inlet with respect to the power generator stator. As a result, the working medium led in from the inlet flows via the power generator rotor and the power generator stator before reaching the outlet. Thus, the power generator rotor and the power generator stator can be more efficiently cooled by surely bringing the working medium in contact with the power generator.

It is preferable, in the power generation apparatus, for the power generator housing to include a cylindrical portion which covers a periphery of the power generator stator about a rotation shaft of the power generator rotor, and a lid portion which blocks an opening of the cylindrical portion and on which the inlet is formed.

The inlet is provided on the lid portion which blocks the opening of the cylindrical portion covering the periphery of the power generator stator in this aspect. As a result, the working medium can be sprayed along the axial direction of the rotation shaft of the power generator rotor from the lid portion toward the power generator rotor and the power generator stator. Thus, the power generator can be more efficiently cooled.

It is preferable, in the power generation apparatus, for the inlet to be arranged on an extension of the rotation shaft of the power generator rotor.

In this aspect, the inlet is arranged on the extension of the rotation shaft of the power generator rotor. As a result, the working medium can be more evenly sprayed from the inlet to the power generator rotor and the power generator stator.

It is preferable, in the power generation apparatus, for the depressurizing mechanism to include at least one flow passage which generates a pressure loss in the working medium.

The working medium can be depressurized by the flow passage of the depressurizing mechanism generating the pressure loss in the working medium in this aspect.

In the power generation apparatus, the depressurizing mechanism may include, in the power generator housing, a distributor which includes a plurality of discharge openings for discharging the working medium, which is led through the inlet into the power generator housing, into the power generator housing.

The distributor having multiple discharge openings can spray the working medium in the form of mist in this aspect. Thus, the working medium can be more surely brought in contact with the power generator rotor and the power generator stator, and the power generator can thus be cooled more efficiently.

In the power generation apparatus, the depressurizing mechanism may include, on the cooling flow passage, a regulation valve capable of adjusting a flow rate of the working medium flowing through the cooling flow passage.

The flow rate of the working medium flowing through the cooling flow passage can be adjusted by the regulation valve in this aspect. Specifically, if the regulation valve is constructed by a throttle valve, the throttle valve has a relatively simple structure, and the production cost of the power generation apparatus can be reduced.

In the power generation apparatus, the depressurizing mechanism further may include a detector which detects the temperature of the power generator, and a controller which controls the flow rate of the working fluid by the regulation valve based on a detection result by the detector; and the controller may control the flow rate of the working medium in accordance with the temperature of the power generator so that the flow rate of the working medium flowing through the cooling flow passage increases as the temperature of the power generator increases.

Moreover, in the power generation apparatus, the depressurizing mechanism may further include an output device which outputs a control command in accordance with the temperature of the power generator; and the regulation valve may control the flow rate of the working medium in response to the control command from the output device so that the flow rate of the working medium flowing through the cooling flow passage increases as the temperature of the power generator increases.

According to these aspects, the flow rate of the working medium can be controlled with the regulation valve in accordance with the temperature of the power generator. As a result, the power generator can be efficiently cooled by increasing the flow rate of the working medium as the temperature of the power generator increases. Meanwhile, if the temperature of the power generator is not high, the working medium can be surely used for the original application (application as a medium for the Rankine cycle) by decreasing the flow rate of the working medium used to cool the power generator.

As described above, according to the present invention, the power generator can be efficiently cooled.

DESCRIPTION OF THE PREFERRED EMBODIMENTS

A description will now be given of embodiments of the present invention referring to accompanying drawings. The following embodiments are examples embodying the present invention, and do not have a nature of limiting a technical scope of the present invention.

First Embodiment

Figure 1:
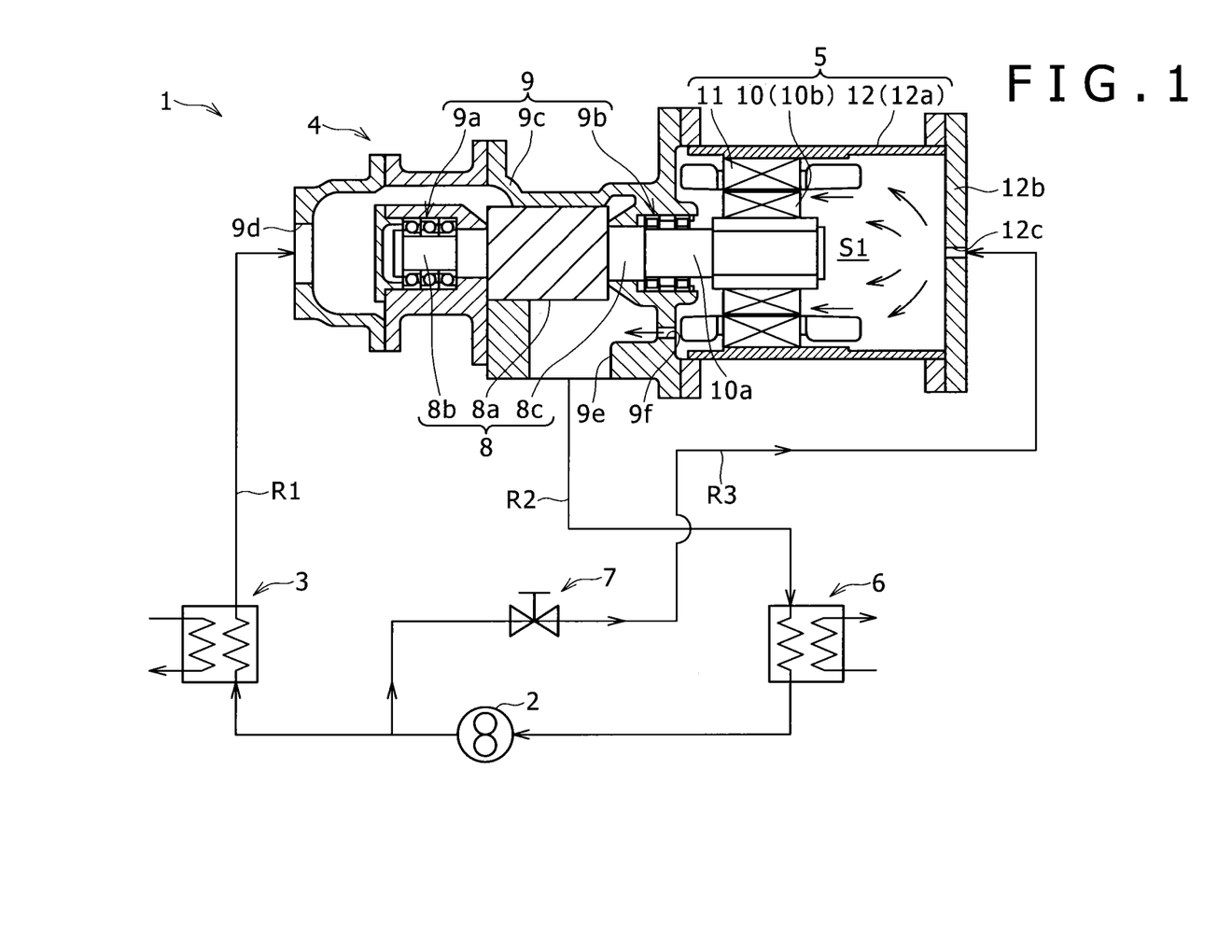
FIG. 1 is a schematic diagram showing an overall configuration of a power generation apparatus according to a first embodiment of the present invention.

FIG. 1 is a schematic diagram showing an overall configuration of a power generation apparatus 1 according to a first embodiment of the present invention.

The power generation apparatus 1 is a power generation apparatus using the Rankine cycle. Specifically, the power generation apparatus 1 is provided with an evaporator 3 which evaporates a working medium, an expander 4 which extracts power from the working medium evaporated in the evaporator 3, a power generator 5 which generates electric power by the power extracted by the expander 4, a condenser 6 which condenses the working medium led out from the expander 4, a circulation pump 2 which transfers the working medium from the condenser 6 to the evaporator 3, and a cooling mechanism described later which cools the power generator 5. It should be noted that R245fa (1,1,1,3,3-pentafluoropropane) or the like is used as the working medium, for example. A description will now be given of a case, as an example, where R245fa is the working medium.

The evaporator 3 is provided on a supply flow passage R1 connecting the circulation pump 2 and the expander 4 with each other. Moreover, the evaporator 3 heats the working medium in the supply flow passage R1. Specifically, the evaporator 3 causes the heat exchange between a heat source at 90° C.-100° C. flowing through a flow passage for heating and the working medium. It should be noted that hot water, steam, superheated air, an exhaust gas, or the like exhausted from a manufacturing facility or the like may be used as the heat source, for example.

The expander 4 according to this embodiment is a screw turbine which converts an expansion force of the working medium evaporated in the evaporator 3 into a rotation force. Specifically, the expander 4 is provided with a pair of expander rotors 8 (one of them is shown in FIG. 1) which are rotated by the expansion force, and an expander housing 9 which stores the expander rotors 8. Each of the expander rotors 8 includes an expander rotor body 8a on which a spiral groove for communicating the working medium is formed, and expander rotation shafts 8b and 8c extending from the expander rotor body 8a to both sides in the axial direction. The respective expander rotor bodies 8a, 8a can rotate in a meshed manner with each other. The working medium expands while passing through a space formed between the spiral grooves of the respective expander rotor bodies 8a, 8a, thereby rotating each of the expander rotor bodies 8a, 8a. The expander housing 9 is provided with bearing portions 9a, 9b which rotationally support the respective expander rotation shafts 8b, 8c, and a rotor storage portion 9c which stores the expander rotor bodies 8a, 8a. The rotor storage portion 9c is provided with an intake opening 9d which leads the working medium from the supply flow passage R1 to each of the expander rotor bodies 8a, an exhaust opening 9e which exhausts the working medium used for the rotation of each of the expander rotor bodies 8a, 8a, and a communication opening 9f which communicates the exhaust opening 9e and a power generator housing 12 described later with each other.

When the working medium is led from the supply flow passage R1 via the intake opening 9d into the expander housing 9, the working medium communicates along the flow passage formed between the respective expander rotor bodies 8a, 8a, thereby rotating the respective expander rotor bodies 8a, 8a about axes of the expander rotation shafts 8b, 8c. The working medium used to rotate the respective expander rotor bodies 8a, 8a is led out via the exhaust opening 9e from the expander housing 9.

The power generator 5 generates electric power using the rotation force of the expander rotors 8. Specifically, the power generator 5 is provided with a power generator rotor 10 which is connected to the expander rotation shaft 8c, a power generator stator 11 which encloses a periphery of the power generator rotor 10, and a power generator housing 12 which stores the power generator rotor 10 and the power generator stator 11. The power generator rotor 10 is provided with a power generator rotation shaft 10a which is connected to the expander rotation shaft 8c, and a power generator rotor body 10b which can rotate about an axis of the power generator rotation shaft 10a. The power generator rotation shaft 10a is supported for rotation by the bearing portions 9a and 9b. In other words, the expander rotation shaft 8c and/or the power generator rotation shaft 10a pass through the expander housing 9. The power generator housing 12 is provided with a cylindrical portion 12a which covers a periphery of the power generator stator 11 about the rotation shaft (shaft of the power generator rotation shaft 10a) of the power generator rotor 10, and a lid portion 12b which blocks one opening (opening on the right side in FIG. 1) of the cylindrical portion 12a. The cylindrical portion 12a can be attached to and detached from the expander housing 9 by means of fixing members (such as bolts) which are not shown. The cylindrical portion 12a, the lid portion 12b, and the expander housing 9 form a power generator chamber S1. An inlet 12c which leads the working medium from a cooling flow passage R3 described later into the power generator housing 12 is formed on the lid portion 12b. The inlet 12c is arranged on an extension of the rotation shaft of the power generator rotor 10. Thus, the working fluid led from the inlet 12c evenly come in contact with the power generator 5 as shown by arrows in FIG. 1.

As described above, the expander 4 and the power generator 5 according to this embodiment constitute a semi-hermetic power generator. It should be noted that the subject to which the present invention is applied is not necessarily limited to a semi-hermetic power generator.

The condenser 6 is provided on a return flow passage R2 which returns the working medium from the expander 4 to the circulation pump 2. The condenser 6 condenses the working medium led out from the expander 4.

The cooling mechanism according to this embodiment is provided with the inlet 12c, a cooling flow passage R3, the communication opening (outlet) 9f, and a throttle valve (depressurizing mechanism) 7. The inlet 12c is provided at a location in an opposite side of the expander rotors 8 with respect to the power generator stator 11 on the generator housing 12, and can lead the working medium into the power generator housing 12. The cooling flow passage R3 supplies the inlet 12c with the working medium from the circulation pump 2 without the intervention of the evaporator 3. Specifically, the cooling flow passage R3 branches from the supply flow passage R1 between the circulation pump 2 and the evaporator 3, and is connected to the inlet 12c. The communication opening 9f communicates the power generator housing 12 and the expander housing 9 with each other so that the working medium in the power generator housing 12 is led to the exhaust opening 9e as described above. Moreover, the communication opening 9f is provided at a location closer to the expander rotor 8 with respect to the power generator stator 11. A throttle valve 7 depressurizes the working medium led from the circulation pump 2 via the cooling flow passage R3 into the power generator housing 12. Specifically, the throttle valve 7 restricts a cross sectional area of the flow passage of the working medium, thereby generating a pressure loss in the working medium. Moreover, the throttle valve 7 can adjust the flow rate of the working fluid.

A description will now be given on effects brought about by the cooling mechanism according to this embodiment.

The working fluid pressurized by the circulation pump 2 is led respectively to the evaporator 3 and the throttle valve 7. The working medium led to the evaporator 3 is used for the power generation and returns to the circulation pump 2. Meanwhile, the flow rate of the working medium led to the throttle valve 7 is restricted to a flow rate in accordance with the opening degree of the throttle valve 7. In other words, the working medium is depressurized by the throttle valve 7. The depressurized working medium is then led through the inlet 12c into the power generator housing 12, and is brought in direct contact with the power generator rotor 10 and the power generator stator 11. On this occasion, the depressurized working medium becomes wet steam by a slight quantity of heat, and thus the heat from the power generator can be used as latent heat for the working medium. The power generator rotor 10 and the power generator stator 11 can thus be efficiently cooled.

As described above, this embodiment includes the inlet 12c which can lead the working medium into the power generator housing 12, and the throttle valve 7 which depressurizes the working medium led via the cooling flow passage from the circulation pump 2 into the power generator housing 12. The depressurized working medium is brought in direct contact with the power generator rotor 10 and the power generator stator 11, so that the power generator 5 is effectively cooled by using a small quantity of the working medium compared to a power generation apparatus in the related art which uses the heat from the power generator as sensible heat, in which the working medium flows through a cooling jacket.

Particularly, according to this embodiment, the inlet 12c is provided at the location on the opposite side of the expander rotors 8 with respect to the power generator stator 11 in the power generator housing 12. As a result, the power generator 5 can be efficiently cooled compared to a case in which the working medium is led into the power generator housing 12 from a location closer to the expander rotor 8 with respect to the power generator stator 11 or a lateral position of the power generator rotor 10.

Specifically, if the working medium is led in from a location closer to the expander rotor 8, there are the shafts (rotation shafts 8b, 10a) connecting both of the power generator rotor 10 and the expander rotor 8 with each other therebetween, and the shafts constitute an obstacle, so that the working medium cannot be efficiently brought in contact with the power generator rotor 10 and the power generator stator 11. Moreover, if the working medium is led in from a lateral position of the power generator stator 11, the working medium can be brought in contact with only a part of the power generator stator 11, so that the entire power generator 5 cannot be efficiently cooled.

In contrast, according to the aforementioned embodiment of the present invention, the working medium can be led in from a location on the opposite side of the shafts (rotation shafts 8b, 10a) connecting the expander rotor 8 and the power generator rotor 10 with each other, which is deviated from a lateral surface of the power generator stator 11. Therefore, according to the present invention, the working medium can be evenly brought in contact with the power generator rotor 10 and the power generator stator 11, and the power generator 5 can be efficiently cooled.

In the aforementioned embodiment, the power generator housing 12 and the expander housing 9 are detachable from each other. As a result, maintenance, replacement of components, and the like can be carried out independently for the power generator 5 and the expander 4. Although a description is given of the example in which the power generator housing 12 and the expander housing 9 are constructed by separate members, they may be constructed by a single housing.

According to the aforementioned embodiment, the power generator housing 12 and the expander housing 9 communicate with each other via the communication opening 9f so that the working medium in the power generator housing 12 is led to the exhaust opening 9e. As a result, the working medium used to cool the power generator 5 can be returned to the condenser 6 by using the exhaust opening 9e used to return the working medium used for the rotation of the expander rotors 8 to the condenser 6. Thus, it is not necessary to newly provide a flow passage (a pipe) to return the working medium used to cool the power generator 5 to the condenser 6, and a manufacturing cost of the power generation apparatus 1 and the size of the power generation apparatus 1 can be restrained. Moreover, a possibility of a leakage of the working medium and the like in the new flow passage can be eliminated, differently from the case of providing the new flow passage.

According to the aforementioned embodiment, the communication opening 9f is provided on the opposite side (expander rotor 8 side) of the inlet 12c with respect to the power generator stator 11. As a result, the working medium led in from the inlet 12c flows through the power generator rotor 10 and the power generator stator 11 before reaching the communication opening 9f. Thus, the power generator can be more efficiently cooled by bringing the working medium surely in contact with the power generator rotor and the power generator stator 11.

According to the aforementioned embodiment, the inlet 12c is provided on the lid portion 12b which blocks the opening of the cylindrical portion 12a covering the periphery of the power generator stator 11. As a result, the working medium can be sprayed along the axial direction of the rotation shafts 10a, 10b of the power generator rotor 10 from the lid portion 12b toward the power generator rotor 10 and the power generator stator 11. Thus, the power generator 5 can be more efficiently cooled.

Particularly, according to the above-mentioned embodiment, the inlet 12c is arranged on the extension of the rotation shafts 10a, 10b of the power generator rotor 10, and the working medium can be more evenly sprayed from the inlet 12c to the power generator rotor 10 and the power generator stator 11.

According to the aforementioned embodiment, the flow rate of the working medium flowing through the cooling flow passage R3 can be adjusted by the throttle valve 7. Moreover, the throttle valve 7 has a relatively simple structure, and the production cost of the power generation apparatus 1 can be reduced.

It should be noted that, according to the aforementioned embodiment, the supply flow passage R1 of the working medium for the expander 4 and the cooling flow passage R3 which supplies the power generator 5 with the working medium are independently provided. As a result, differently from a case where the working medium led out from the expander 4 is used to cool the power generator 5, metal dusts (namely, contamination) in the working medium is surely prevented from being mixed into the power generator 5. Specifically, for example, in the return flow passage R2 between the expander 4 and the condenser 6 or the cooling flow passage R3, a filter which removes the metal dusts, which is not shown, is provided, and the working medium from which the metal dusts are removed by the filter can be led via the cooling flow passage R3 to the power generator 5.

Second Embodiment

Figure 2:
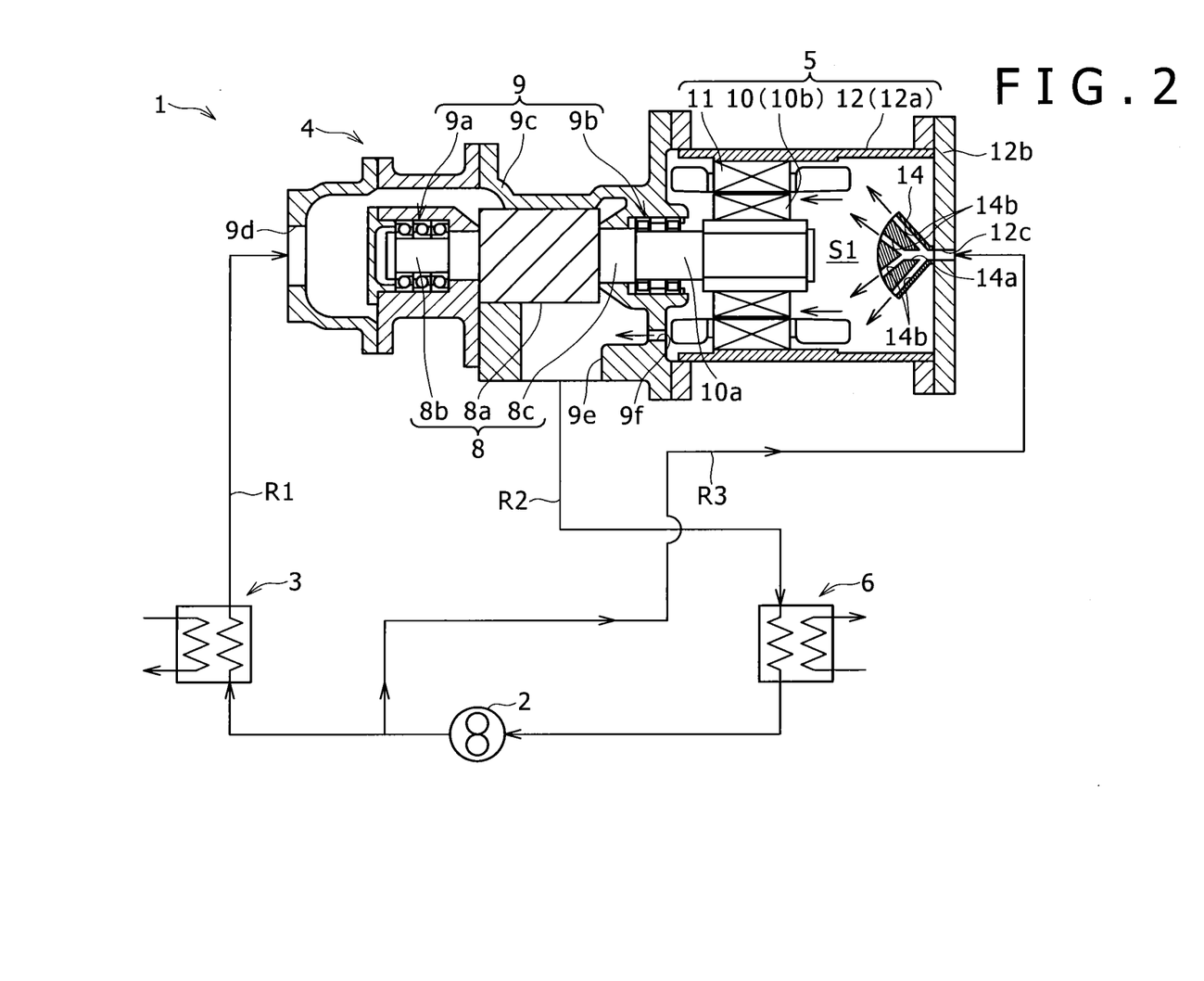
FIG. 2 is a schematic diagram showing an overall configuration of the power generation apparatus according to a second embodiment of the present invention.

A description will now be given of a second embodiment according to the present invention referring to FIG. 2. Like components are denoted by like numerals as of the first embodiment and will not be further explained.

The power generation apparatus 1 according to the second embodiment is provided with a distributor 14 provided in the power generator housing 12 instead of the throttle valve 7. The distributor 14 includes multiple discharge openings which discharge the working medium led into the power generator housing 12 through the inlet 12c into the power generator housing 12. Specifically, the distributor 14 is provided with a trunk flow passage 14a which communicates with the inlet 12c, and four branch flow passages 14b branched from an end of the trunk flow passage. End portions of the respective branch flow passages 14b respectively form discharge openings opening into the power generator housing 12.

The trunk flow passage 14a and the respective branch flow passages 14b generate a pressure loss in the working medium flowing therethrough. Specifically, the distributor 14 includes throttle portions provided at locations through which the working medium to be discharged from the respective branch flow passages 14b passes. The throttle portion is provided at least a part of the trunk flow passage 14a and the respective branch flow passages 14b, and is a portion which has a smaller cross sectional area than that of the cooling flow passage R3.

According to the aforementioned embodiment, the distributor 14 having multiple discharge openings can spray the working medium in the form of mist. Thus, the working medium can be more surely brought in contact with the power generator rotor 10 and the power generator stator 11, and the power generator 5 can thus be cooled more efficiently.

Third Embodiment

Figure 3:
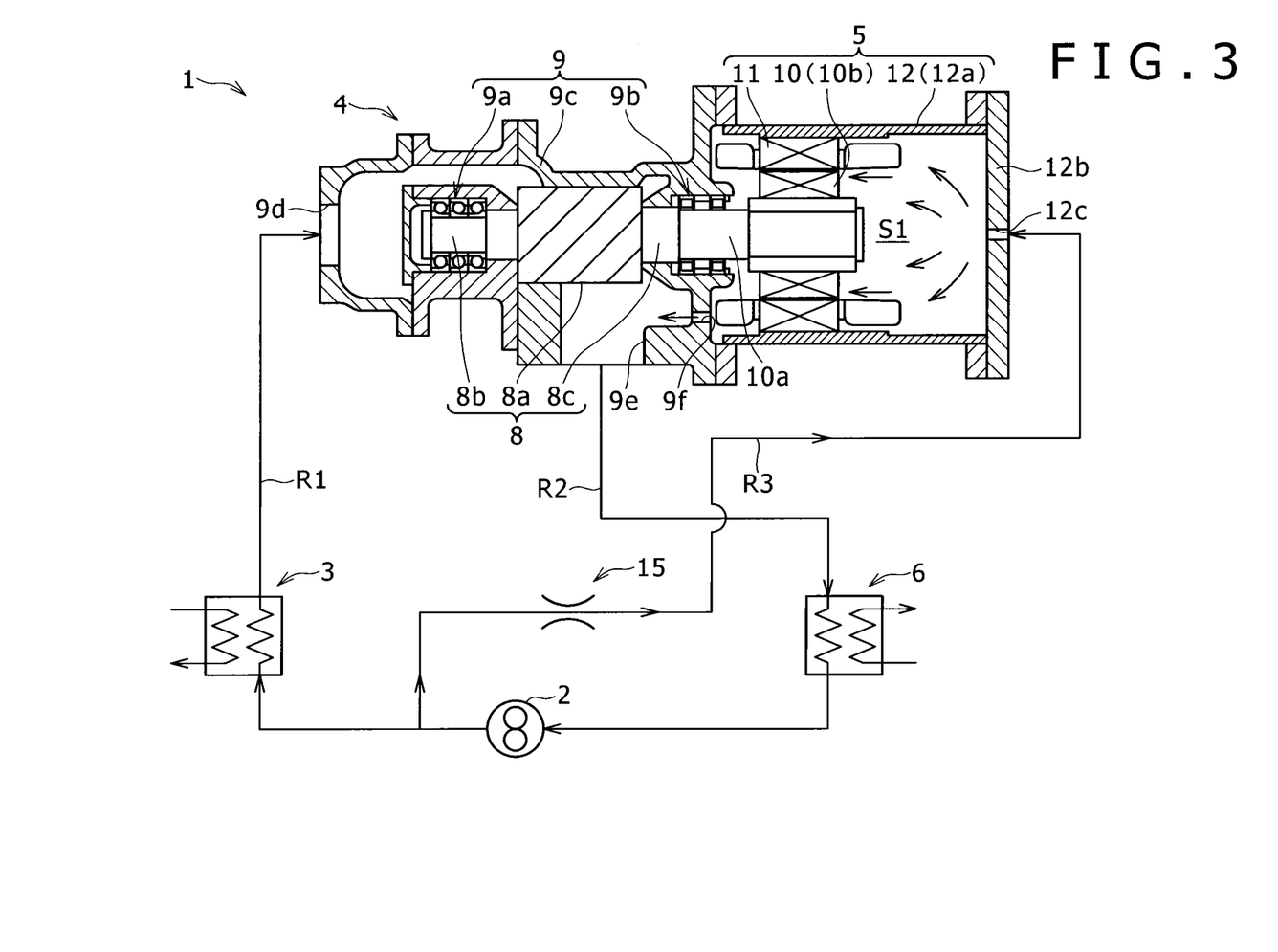
FIG. 3 is a schematic diagram showing an overall configuration of the power generation apparatus according to a third embodiment of the present invention.

A description will now be given of a third embodiment according to the present invention referring to FIG. 3. Like components are denoted by like numerals as of the first embodiment and will not be further explained.

The power generation apparatus 1 according to the third embodiment is provided with a capillary tube 15 provided in the cooling flow passage R3 instead of the throttle valve 7. The capillary tube 15 generates a pressure loss in the working medium flowing through the cooling flow passage R3. Specifically, the capillary tube 15 has a cross sectional area smaller than that of the cooling flow passage R3.

According to the aforementioned embodiment, the capillary tube having a simpler construction than that of the throttle valve 7 can be used. As a result, a production cost of the power generation apparatus 1 can be further reduced.

Fourth Embodiment

Figure 4:
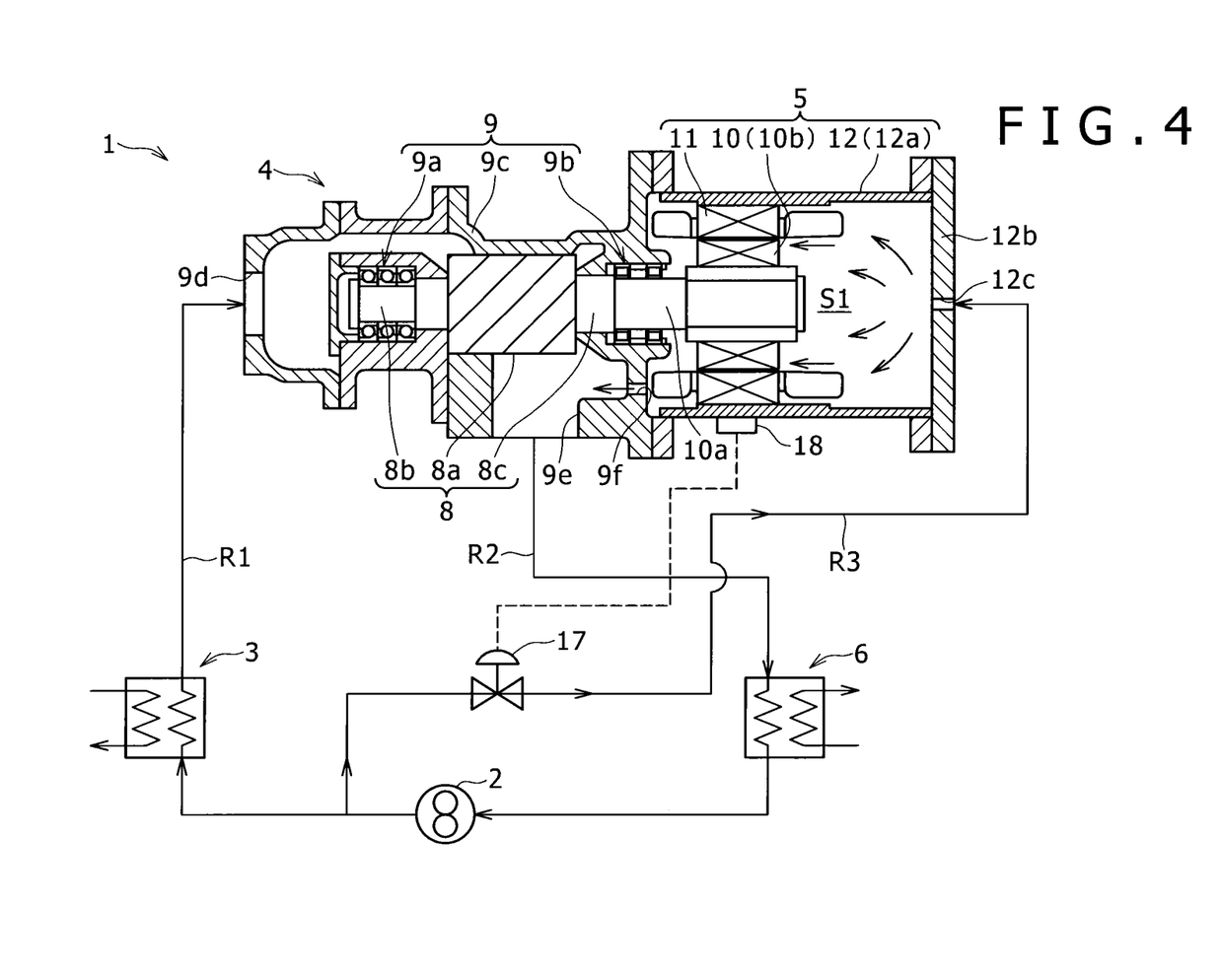
FIG. 4 is a schematic diagram showing an overall configuration of the power generation apparatus according to a fourth embodiment of the present invention.

A description will now be given of a fourth embodiment according to the present invention referring to FIG. 4. Like components are denoted by like numerals as of the first embodiment and will not be further explained.

The power generation apparatus 1 according to the fourth embodiment is provided with an expansion valve (regulation valve) 17 provided in the cooling flow passage R3 and a temperature sensitive cylinder (output device) 18 provided on the power generator 5, instead of the throttle valve 7.

The expansion valve 17 can adjust the flow rate of the working medium flowing through the cooling flow passage R3. Specifically, the expansion valve 17 is provided with a diaphragm, and a valve stem which changes an opening area of the flow passage in accordance with a displacement of the diaphragm, which are not shown. The temperature sensitive cylinder 18 outputs a control command in accordance with the temperature of the power generator 5. Specifically, the temperature sensitive cylinder 18 internally includes a gas which expands or contracts in accordance with the peripheral temperature, and an expansion force or a contraction force of the gas is transmitted, as the control command, to the diaphragm of the expansion valve 17. The temperature sensitive cylinder 18 is attached to a position corresponding to the power generator stator 11 on an external surface of the power generator housing 12.

A description will now be given of the operation of the expansion valve 17. If the temperature of the power generator 5 (particularly the power generator rotor 10) increases, the gas in the temperature sensitive cylinder 18 expands, and the valve stem of the expansion valve 17 is pushed down via the diaphragm. As a result, the opening area of the flow passage of the working medium increases, and the cooling for the power generator 5 is promoted. Meanwhile, if the temperature of the power generator 5 decreases, the gas in the temperature sensitive cylinder 18 contracts, and the valve stem of the expansion valve 17 is pushed up via the diaphragm. As a result, the opening area of the flow passage of the working medium decreases, and the cooling for the power generator 5 is restrained.

According to the aforementioned embodiment, the flow rate of the working medium can be controlled by the expansion valve 17 in accordance with the temperature of the power generator 5. As a result, the power generator 5 can be efficiently cooled by increasing the flow rate of the working medium as the temperature of the power generator 5 increases. Meanwhile, if the temperature of the power generator 5 is not high, the working medium can be surely used for the original application (application as a medium for the Rankine cycle) by decreasing the flow rate of the working medium used to cool the power generator 5.

Fifth Embodiment

Figure 5:
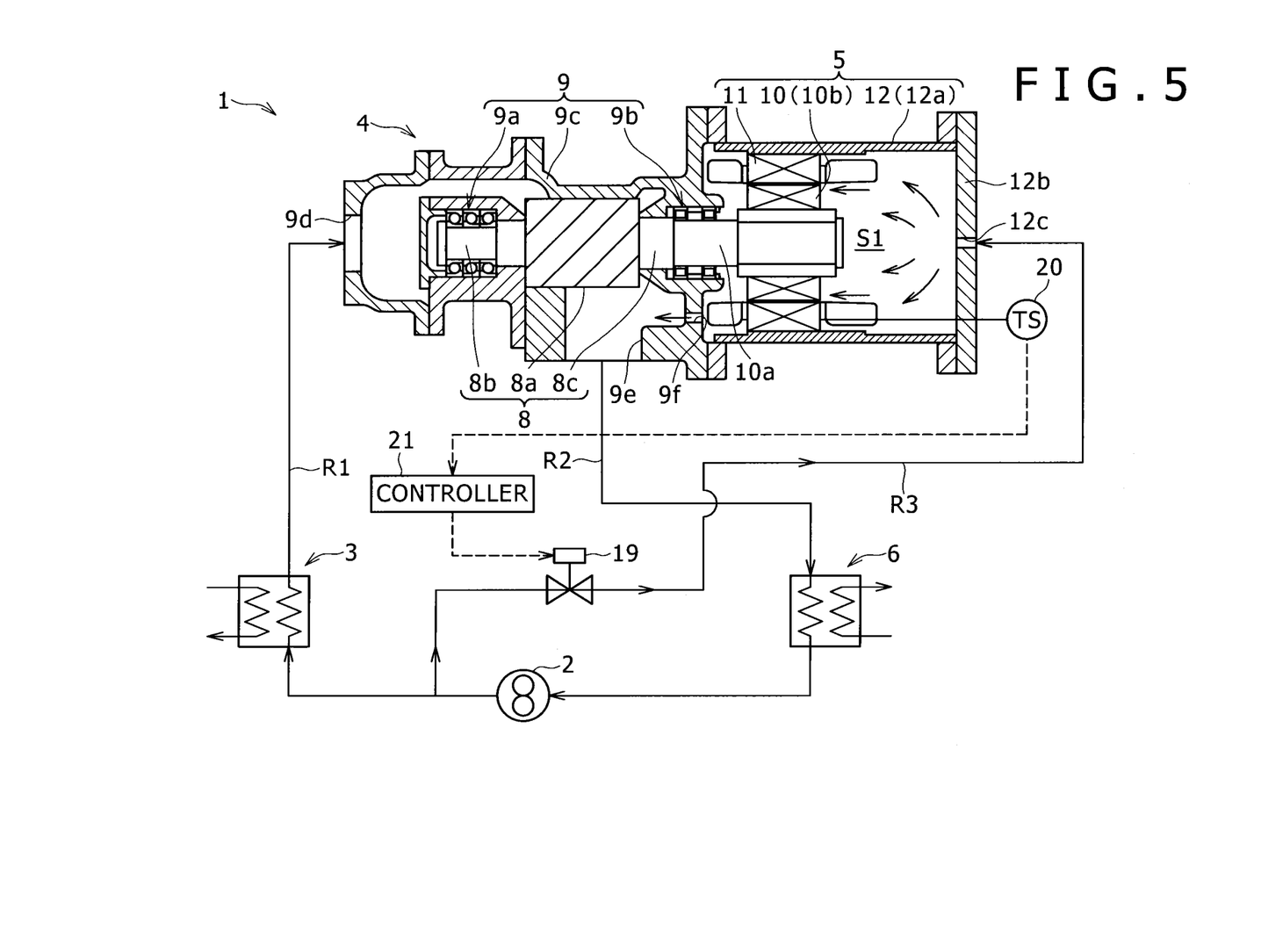
FIG. 5 is a schematic diagram showing an overall configuration of the power generation apparatus according to a fifth embodiment of the present invention.

A description will now be given of a fifth embodiment according to the present invention referring to FIG. 5. Like components are denoted by like numerals as of the first embodiment and will not be further explained.

The power generation apparatus 1 according to the fifth embodiment is provided with, instead of the throttle valve 7, an electromagnetic valve 19 provided in the cooling flow passage R3, a temperature sensor (detector) 20 which detects the temperature of the power generator rotor 10, and a controller (controlling device) 21 which controls the electromagnetic valve 19 based on a detection result by the temperature sensor 20.

The electromagnetic valve 19 can change the cross sectional area of the flow passage of the working medium, thereby adjusting the flow rate of the working medium flowing through the cooling flow passage R3. The temperature sensor 20 outputs an electrical signal in accordance with the temperature of the power generator rotor 10 to the controller. The controller 21 controls the operation of the electromagnetic valve 19 so as to increase the flow rate of the working medium in accordance with increase of the temperature of the power generator rotor 10.

A description will now be given of effects of this embodiment. As the temperature of the power generator rotor 10 increases, the operation of the electromagnetic valve 19 is controlled so as to increase the flow rate of the working medium in response to the electrical signal from the temperature sensor 20. As a result, the cooling for the power generator 5 is promoted. As the temperature of the power generator rotor 10 decreases, the operation of the electromagnetic valve 19 is controlled so as to decrease the flow rate of the working medium in response to the electrical signal from the temperature sensor 20. As a result, the cooling for the power generator 5 is restrained.

According to the aforementioned embodiment, the flow rate of the working medium can be controlled by the electromagnetic valve 19 in accordance with the temperature of the power generator 5. As a result, the power generator 5 can be efficiently cooled by increasing the flow rate of the working medium as the temperature of the power generator 5 increases. Meanwhile, if the temperature of the power generator 5 is not high, the working medium can be surely used for the original application (application as a medium for the Rankine cycle) by decreasing the flow rate of the working medium used to cool the power generator 5.

Sixth Embodiment

A description will now be given of a sixth embodiment according to the present invention referring to FIGS. 6 and 7. Like components are denoted by like numerals as of the first embodiment and will not be further explained.

Figure 6:
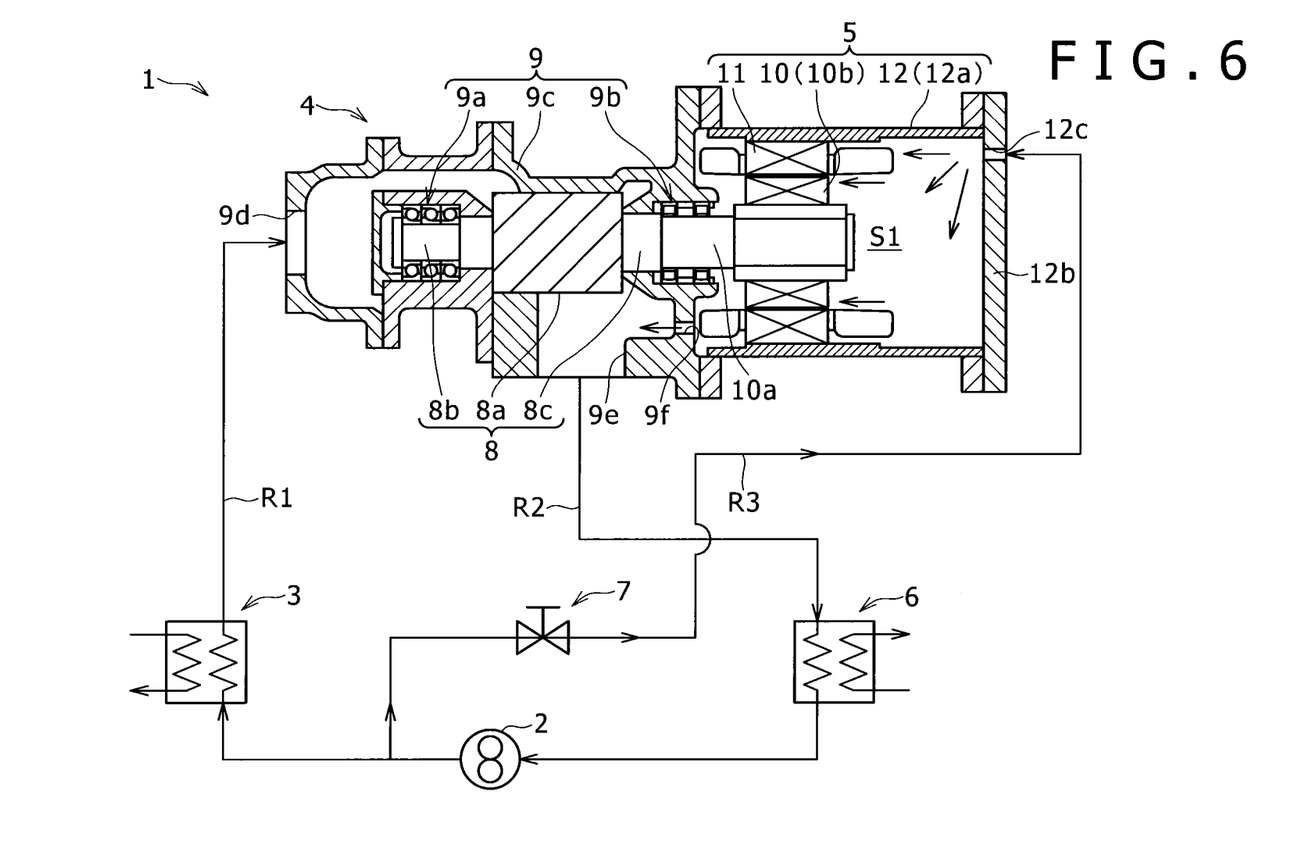
FIG. 6 is a schematic diagram showing an overall configuration of the power generation apparatus according to a sixth embodiment of the present invention.
Figure 7:
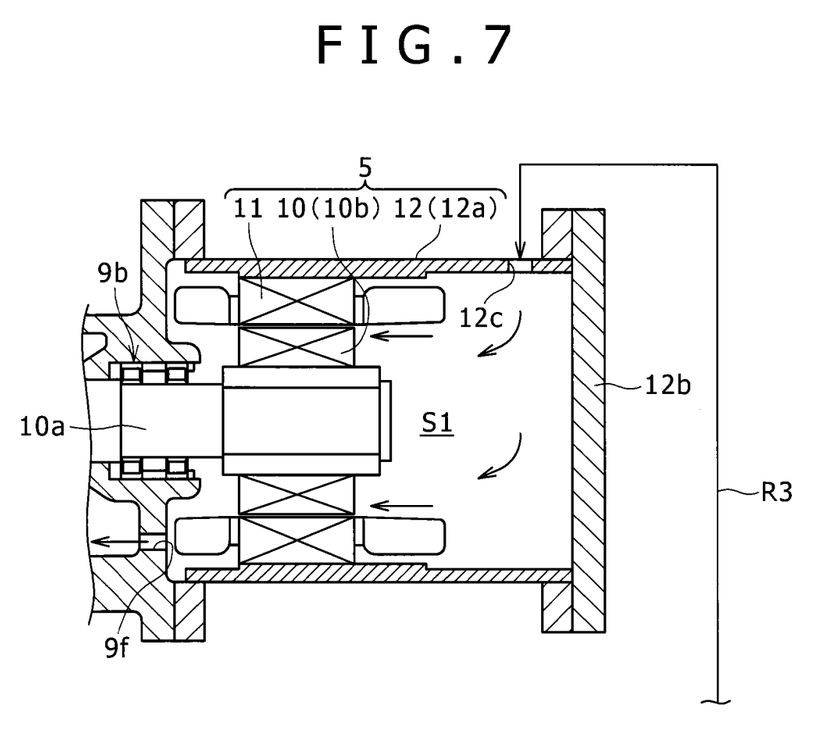
FIG. 7 is a schematic diagram showing a variation of the power generation apparatus according to the sixth embodiment of the present invention.

The power generation apparatuses 1 shown in FIGS. 6 and 7 are different in the location of the inlet 12c from the first embodiment. Specifically, the inlet 12c shown in FIG. 6 is arranged at a location deviating (deviating upward in FIG. 6) from the extension of the rotation shaft of the power generator rotor 10 on the lid portion 12b. Meanwhile, the inlet 12c shown in FIG. 7 is provided at a location closer to the lid portion 12b compared to the power generator stator 10 on the cylindrical portion 12a of the power generator housing 12.

Also in this embodiment, the inlet 12c is provided at a location opposite to the expander rotors 8 with respect to the power generator stator 11. As a result, the power generator can be efficiently cooled compared to a case in which the working medium is led into the power generator housing 12 from a location closer to the expander rotor 8 with respect to the power generator stator 11 or a lateral position of the power generator stator 11. Specifically, the working medium can be led from the location on the opposite side of the shafts (8c, 10a) connecting the expander rotor 8 and the power generator rotor 10 with each other, which is deviated from the lateral surface of the power generator stator 11. Therefore, according to the present invention, the working medium can be evenly brought in contact with the power generator rotor 10 and the power generator stator 11, and the power generator can be efficiently cooled.

Although the power generation apparatus 1 according to the respective aforementioned embodiments is alternatively provided with the throttle valve 7, the distributor 14, the capillary tune 15, the expansion valve 17 (temperature sensitive cylinder 18), and the electromagnetic valve 19 (temperature sensor 20 and controller 21), the power generation apparatus 1 is not limited to thereto. Specifically, it is sufficient for the power generation apparatus 1 to be provided with at least one of the throttle valve 7, the distributor 14, the capillary tune 15, the expansion valve 17 (temperature sensitive cylinder 18), and the electromagnetic valve 19 (temperature sensor 20 and controller 21). On this occasion, if the distributor 14 and another component are combined, the depressurization of the working medium may be realized by the other component instead of the distributor 14. In other words, the distributor 14 may be used only to divide the flow passage for the working medium.

Although the pressure loss is generated in the working medium with the throttle valve 7, the distributor 14, the capillary tune 15, the expansion valve 17 (temperature sensitive cylinder 18), and the electromagnetic valve 19 (temperature sensor 20 and controller 21) according to the aforementioned embodiments, the present invention is not limited thereto. Specifically, another configuration which can restrict the cross sectional area of the flow passage through which the working medium flows compared to other portions can be employed. Moreover, the inlet 12c having a smaller cross sectional area than that of the cooling flow passage R3 may generate a pressure loss in the working medium. In other words, the inlet 12c also serves as the depressurizing mechanism in this case.

What is claimed is:

1. A power generation apparatus comprising:
an evaporator that evaporates a working medium;
an expander that includes an expander rotor rotated by an expansion force of the working medium evaporated in the evaporator;
a power generator that includes a power generator rotor connected to the expander rotor, a power generator stator arranged around the power generator rotor for generating electric power with the power generator rotor, and a power generator housing for storing the power generator rotor and the power generator stator;
a condenser that condenses the working medium led out from the expander;
a circulation pump that transfers the working medium from the condenser to the evaporator; and
a cooling mechanism that cools the power generator, wherein the cooling mechanism includes:
an inlet which is provided at a location on an opposite side of the expander rotor with respect to the power generator stator in the power generator housing, and is capable of leading the working medium into the power generator housing;
a cooling flow passage which supplies the inlet from the circulation pump with the working medium;
an outlet capable of leading the working medium out of the power generator housing so as to lead the working medium to the condenser; and
a depressurizing mechanism that depressurizes the working medium led via the cooling flow passage from the circulation pump into the power generator housing,
wherein the expander includes an expander housing directly connected with the power generator housing and which stores the expander rotor, and the power generator housing and the expander housing are detachable from each other,
wherein an exhaust opening which leads the working medium used for rotation of the expander rotor out from the expander housing is provided on the expander housing, and
wherein the outlet capable of leading the working medium out of the power generator housing communicates the power generator housing and the expander housing with each other so that the working medium in the power generator housing is led to the exhaust opening.

2. The power generation apparatus according to claim 1, wherein the outlet is provided at a location closer to an expander rotor with respect to the power generator stator.

3. The power generation apparatus according to claim 1, wherein the power generator housing includes a cylindrical portion which covers a periphery of the power generator stator about a rotation shaft of the power generator rotor, and a lid portion which blocks an opening of the cylindrical portion and on which the inlet is formed.

4. A power generation apparatus comprising:
an evaporator that evaporates a working medium;
an expander that includes an expander rotor rotated by an expansion force of the working medium evaporated in the evaporator;
a power generator that includes a power generator rotor connected to the expander rotor, a power generator stator arranged around the power generator rotor for generating electric power with the power generator rotor, and a power generator housing for storing the power generator rotor and the power generator stator;
a condenser that condenses the working medium led out from the expander;
a circulation pump that transfers the working medium from the condenser to the evaporator; and
a cooling mechanism that cools the power generator, wherein the cooling mechanism includes:
an inlet which is provided at a location on an opposite side of the expander rotor with respect to the power generator stator in the power generator housing, and is capable of leading the working medium into the power generator housing;
a cooling flow passage which supplies the inlet from the circulation pump with the working medium;
an outlet capable of leading the working medium out of the power generator housing so as to lead the working medium to the condenser; and
a depressurizing mechanism that depressurizes the working medium led via the cooling flow passage from the circulation pump into the power generator housing,
wherein the inlet is arranged on an extension of the rotation shaft of the power generator rotor.

5. A power generation apparatus comprising:
an evaporator that evaporates a working medium;
an expander that includes an expander rotor rotated by an expansion force of the working medium evaporated in the evaporator;
a power generator that includes a power generator rotor connected to the expander rotor, a power generator stator arranged around the power generator rotor for generating electric power with the power generator rotor, and a power generator housing for storing the power generator rotor and the power generator stator;
a condenser that condenses the working medium led out from the expander;
a circulation pump that transfers the working medium from the condenser to the evaporator; and
a cooling mechanism that cools the power generator, wherein the cooling mechanism includes:
an inlet which is provided at a location on an opposite side of the expander rotor with respect to the power generator stator in the power generator housing, and is capable of leading the working medium into the power generator housing;
a cooling flow passage which supplies the inlet from the circulation pump with the working medium;
an outlet capable of leading the working medium out of the power generator housing so as to lead the working medium to the condenser; and
a depressurizing mechanism that depressurizes the working medium led via the cooling flow passage from the circulation pump into the power generator housing,
wherein the depressurizing mechanism includes at least one flow passage which generates a pressure loss in the working medium,
wherein the depressurizing mechanism includes, on the cooling flow passage, a regulation valve capable of adjusting a flow rate of the working medium flowing through the cooling flow passage,
wherein the depressurizing mechanism further includes a detector which detects the temperature of the power generator, and a controller which controls the flow rate of the working medium by the regulation valve based on a detection result by the detector, and the controller controls the flow rate of the working medium in accordance with the temperature of the power generator so that the flow rate of the working medium flowing through the cooling flow passage increases as the temperature of the power generator increases, and
wherein the depressurizing mechanism further includes an output device which outputs a control command in accordance with the temperature of the power generator, and the regulation valve controls the flow rate of the working medium in response to the control command from the output device so that the flow rate of the working medium flowing through the cooling flow passage increases as the temperature of the power generator increases.

6. The power generation apparatus according to claim 5, wherein the depressurizing mechanism includes, in the power generator housing, a distributor which includes a plurality of discharge openings for discharging the working medium, which is led through the inlet into the power generator housing, into the power generator housing.

* * * * *